Patented Jan. 17, 1933

1,894,702

UNITED STATES PATENT OFFICE

GERMAINE PECHIN, NÉE LACROUX, OF BOIS-COLOMBES, FRANCE

PROCESS FOR PREPARING TRANSPARENT PHENOL-FORMALDEHYDE RESINS

No Drawing. Application filed December 4, 1930, Serial No. 500,145, and in France December 4, 1929.

As it is well known the condensation products of phenols and formaldehyde are of a more or less distinct yellow hue and have also different properties according to the employed catalyzer.

My invention relates to a process for preparing artificial resins by condensing phenols and formaldehyde, which consists in adding a specially prepared product to said substances, during the condensation, in order to discolour the resins resulting from that operation and to render them transparent like glass without perceptibly changing their physical and chemical properties.

The discolouring or bleaching product is a mixture of acetic acid, camphor, glycerine, hydrochloric acid and it is added to said substances as soon as the condensation water begins to evaporate from the resins.

*Example.*—90 grammes of acetic acid, 7 grammes of camphor, 2 grammes of glycerine and 1 gramme of hydrochloric acid are boiled in a flask connected to a reflux condenser. The mixture resulting from this operation is added to the resinous mass at a ratio of 3% of said mass, as soon as the water begins to evaporate from the resin. The water is then completely evaporated in a vacuum and the remaining product is poured in suitable moulds and polymerized in a known manner or ground to powder for use in presses with heating plates.

I claim:

1. In a process for preparing transparent artificial resins by condensing phenols and formaldehyde the addition of a bleaching or discolouring agent consisting of a mixture of acetic acid, camphor, glycerine and hydrochloric acid.

2. In a process as claimed in claim 1, 90 grammes of acetic acid, 7 grammes of camphor, 2 grammes or glycerine and 1 gramme of hydrochloric acid put to ebullition and added to the resinous mass at a ratio of 3% of the latter.

G. PECHIN, NÉE LACROUX.